United States Patent
Hammond et al.

(10) Patent No.: US 11,858,688 B2
(45) Date of Patent: Jan. 2, 2024

(54) MULTI-VESSEL DRINK CONTAINERS

(71) Applicant: CamelBak Products, LLC, Petaluma, CA (US)

(72) Inventors: Kelsey O. Hammond, Santa Rosa, CA (US); Benjamin E. Vierck, Petaluma, CA (US)

(73) Assignee: CAMELBAK PRODUCTS, LLC, Petaluma, CA (US)

( * ) Notice: Subject to any disclaimer, the term of this patent is extended or adjusted under 35 U.S.C. 154(b) by 357 days.

(21) Appl. No.: 16/579,236

(22) Filed: Sep. 23, 2019

(65) Prior Publication Data

US 2021/0086944 A1    Mar. 25, 2021

(51) Int. Cl.
*B65D 21/02* (2006.01)
*B65D 43/02* (2006.01)
(Continued)

(52) U.S. Cl.
CPC ..... *B65D 21/0233* (2013.01); *A47G 19/2205* (2013.01); *A47G 19/23* (2013.01);
(Continued)

(58) Field of Classification Search
CPC ............ A47G 19/2288; A47G 19/2272; A47G 19/23; A47G 19/2205; B65D 21/0233
See application file for complete search history.

(56) References Cited

U.S. PATENT DOCUMENTS 3,581,927 A    6/1971 Langdon
4,600,111 A    7/1986 Brown
(Continued)

FOREIGN PATENT DOCUMENTS

CN    202514876 U    11/2012
CN    103637627 A    3/2014
(Continued)

OTHER PUBLICATIONS

Vizun Mug Hug-Flexible Lid For Large Mugs (Year: 2010).*
(Continued)

*Primary Examiner* — Jeffrey R Allen
(74) *Attorney, Agent, or Firm* — Amardeep S. Grewal; Gerard M. Donovan; Reed Smith LLP

(57) ABSTRACT

Multi-vessel drink containers. In examples, a multi-vessel drink container includes a primary vessel, a secondary vessel, a primary closure configured to close the primary vessel, and a secondary closure configured to close the secondary vessel. In examples, the primary closure includes a primary closure base portion that defines a storage compartment and a compartment closure configured to close the storage compartment. In examples, the secondary vessel is configured to be selectively transitioned between a nested configuration, in which the secondary vessel is operatively coupled to the primary vessel, and a drink configuration, in which the secondary vessel is removed from the primary vessel. In examples, the secondary closure is configured to be selectively transitioned between a stowed configuration, in which the secondary closure is received within the storage compartment, and a use configuration, in which the secondary closure is operatively coupled to the secondary vessel.

20 Claims, 5 Drawing Sheets

(51) Int. Cl.
- *A47G 19/22* (2006.01)
- *A47G 19/23* (2006.01)
- *B65D 51/24* (2006.01)

(52) U.S. Cl.
CPC ....... *B65D 43/0231* (2013.01); *B65D 51/242* (2013.01); *B65D 2543/00046* (2013.01)

(56) References Cited

U.S. PATENT DOCUMENTS

| | | |
|---|---|---|
| 5,531,353 A | 7/1996 | Ward et al. |
| D402,556 S | 12/1998 | Frye |
| 6,196,411 B1 | 3/2001 | Nava et al. |
| 6,405,675 B1 | 6/2002 | Mills |
| 6,409,038 B1 | 6/2002 | Karp |
| 7,055,709 B1 | 6/2006 | Esau |
| 7,798,346 B2 | 9/2010 | Nelson et al. |
| 7,845,489 B2 | 12/2010 | Thompson |
| 8,113,364 B1 | 2/2012 | Asadi |
| 8,181,810 B2 | 5/2012 | Jones |
| 8,342,346 B2 | 1/2013 | Rances |
| 8,596,480 B2 | 12/2013 | Arjomand |
| 8,695,830 B2 * | 4/2014 | Meyers ............... B65D 47/0895 220/254.3 |
| 8,727,149 B1 | 5/2014 | Reid et al. |
| 8,899,435 B1 | 12/2014 | Reder et al. |
| D727,097 S | 4/2015 | Sorensen et al. |
| D732,339 S | 6/2015 | Sorensen et al. |
| 9,078,535 B1 | 7/2015 | Buck |
| 9,216,843 B2 | 12/2015 | Sorensen et al. |
| D768,507 S | 10/2016 | Hotell |
| 9,492,024 B2 | 11/2016 | Sorensen et al. |
| 9,555,948 B2 * | 1/2017 | Nemeth ................. B23K 31/02 |
| 9,833,090 B2 | 12/2017 | Ross et al. |
| 10,179,674 B2 | 1/2019 | Anthony |
| 2006/0131309 A1 | 6/2006 | Listenberger et al. |
| 2008/0000898 A1 | 1/2008 | Ramsden |
| 2009/0057312 A1 | 3/2009 | Beyers, III |
| 2009/0188884 A1 | 7/2009 | Nelson et al. |
| 2009/0230082 A1 | 9/2009 | Dickerson |
| 2009/0266737 A1 | 10/2009 | Cole |
| 2011/0024415 A1 | 2/2011 | Davtyan |
| 2011/0163102 A1 | 7/2011 | Haynie |
| 2012/0193316 A1 | 8/2012 | Starks |
| 2016/0249755 A1 | 9/2016 | Sorensen et al. |
| 2017/0127859 A1 | 5/2017 | Hornung et al. |
| 2017/0190458 A1 | 7/2017 | Tinsley |
| 2018/0237186 A1 | 8/2018 | Stathis |
| 2018/0332986 A1 | 11/2018 | Sorensen et al. |

FOREIGN PATENT DOCUMENTS

| | | |
|---|---|---|
| CN | 204635844 U | 9/2015 |
| CN | 204950368 U | 1/2016 |
| CN | 205409055 U | 8/2016 |
| CN | 206166506 U | 5/2017 |
| CN | 107296453 A | 10/2017 |
| CN | 108420270 A | 8/2018 |
| CN | 208017317 U | 10/2018 |
| DE | 9302022 * | 6/1994 |
| DE | 202015106498 U1 | 1/2016 |
| JP | 2002080045 A | 3/2002 |
| JP | 3202638 U | 1/2016 |
| JP | 2016187642 A | 11/2016 |
| KR | 2020060000096 U | 12/2006 |
| KR | 101725792 B1 | 4/2017 |
| KR | 2020170003053 U | 8/2017 |
| KR | 101895537 B1 | 9/2018 |
| NL | 2015890 B1 | 5/2017 |
| WO | WO 2013/142925 A2 | 10/2013 |

OTHER PUBLICATIONS

English-language machine translation of Japanese Patent Publication No. JP 2002080045 A, Global Patent Solutions, Oct. 17, 2018.
English-language machine translation of Korean Utility Model Publication No. KR 2020060000096 U, Global Patent Solutions, Apr. 3, 2019.
English-language machine translation of Chinese Utility Model Publication No. CN 202514876 U, Global Patent Solutions, Apr. 3, 2019.
English-language machine translation of Chinese Patent Publication No. CN 103637627 A, Google Patents, https://patents.google.com/patent/CN103637627A/en?oq=CN103637627, Dec. 28, 2018.
English-language machine translation of Chinese Utility Model Publication No. CN 204635844 U, Global Patent Solutions, Apr. 3, 2019.
English-language machine translation of Chinese Utility Model Publication No. CN 204950368 U, Global Patent Solutions, Apr. 3, 2019.
English-language machine translation of Japanese Utility Model Publication No. JP 3202638 U, Global Patent Solutions, Apr. 3, 2019.
English-language machine translation of German Utility Model No. DE 202015106498 U1, Global Patent Solutions, Apr. 3, 2019.
English-language machine translation of Chinese Utility Model Publication No. CN 205409055 U, Global Patent Solutions, Apr. 3, 2019.
English-language machine translation of Japanese Patent Publication No. JP 2016187642 A, Global Patent Solutions, Apr. 3, 2019.
English-language machine translation of Korean Patent Publication No. KR 101725792 B1, Global Patent Solutions, Oct. 17, 2018.
English-language machine translation of Chinese Utility Model Publication No. CN 206166506 U, Global Patent Solutions, Oct. 17, 2018.
English-language machine translation of Netherlands Patent Publication No. NL 2015890 B1, Global Patent Solutions, Apr. 3, 2019.
English-language machine translation of Korean Utility Model Publication No. KR 2020170003053 U, Global Patent Solutions, Oct. 17, 2018.
English-language machine translation of Chinese Patent Publication No. CN 107296453 A, Global Patent Solutions, Apr. 3, 2019.
English-language machine translation of Chinese Patent Publication No. CN 108420270 A, Global Patent Solutions, Oct. 17, 2018.
English-language machine translation of Korean Patent Publication No. KR 101895537 B1, Global Patent Solutions, Oct. 17, 2018.
English-language machine translation of Chinese Utility Model Publication No. CN 208017317 U, Global Patent Solutions, Apr. 3, 2019.
Dog Water Bottle and Bowl, http://www.flaskdog.com/, retrieved Oct. 17, 2018. Admitted Prior Art.
Firelight 750 Flask, High Camp Flasks, https://highcampflasks.com/products/firelight-flasks-750ml?_pos=1&_sid=b9d714129&_ss=r, retrieved Sep. 9, 2019. Admitted Prior Art.
H2Joe bottle, https://h2joe.com/, retrieved Feb. 11, 2019. Admitted Prior Art.
Hibear All-Day Adventure Flask, https://www.hibearoutdoors.com, retrieved May 2, 2019. Admitted Prior Art.
Licensed Character Water Bottles with Attached Snack Containers, https://www.dollartree.com/licensed-character-water-bottles-with-attached-snack-containers/263328, retrieved Oct. 17, 2018. Admitted Prior Art.
Marina Sport Bottle with Hidden Compartment—28 oz., https://www.4imprint.com/product/132657/Marina-Sport-Bottle-with-Hidden-Compartment-28-oz, retrieved Apr. 3, 2019. Admitted Prior Art.
The Protein Shaker with a Compartment—the ProStak™ | BlenderBottle®, https://www.blenderbottle.com/products/prostak, retrieved Apr. 3, 2019. Admitted Prior Art.
Sigg 8516.2" Hot & Cold Brushed Drinking Bottle, https://www.amazon.com/Sigg-8516-2-Brushed-drinking-multicolor/dp/B00SYHUU7Y, retrieved Sep. 9, 2019. Admitted Prior Art.

* cited by examiner

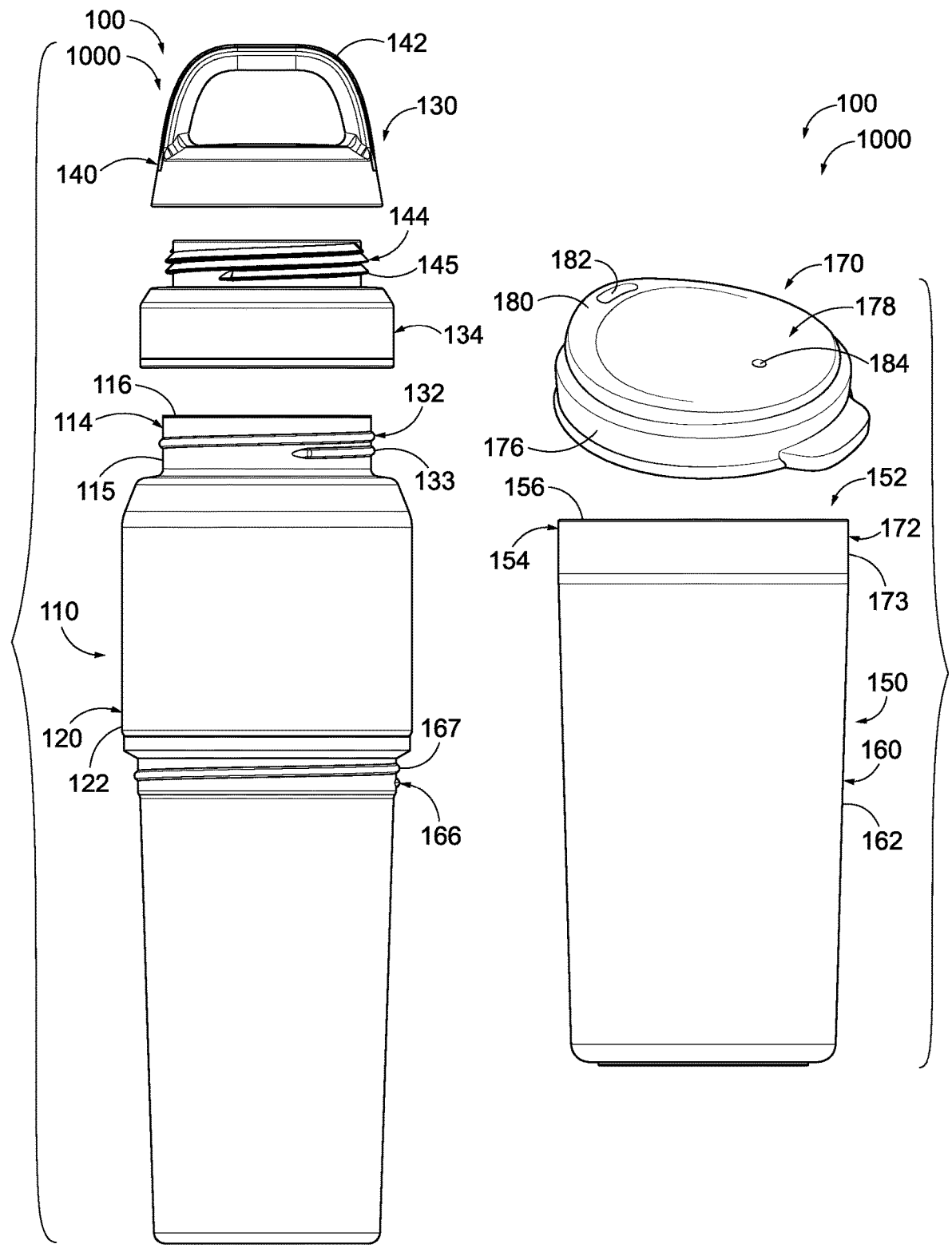

MULTI-VESSEL DRINK CONTAINERS

FIELD

The present disclosure relates to drink containers, and more particularly to multi-vessel drink containers that include multiple distinct vessels.

BACKGROUND

Drink containers for storing, transporting, and/or consuming potable drink fluids generally are sized according to the intended use thereof. For example, a drink container for transporting a drink fluid may include a relatively large vessel to contain a larger volume of the drink fluid, while a drink container for direct consumption of the drink fluid (e.g., by bringing the drink container directly to the user's mouth) may include a comparatively small vessel for ease of use by the user. Accordingly, large drink containers for transporting drink fluids may be inconvenient to utilize for direct consumption of the drink fluids, while smaller drink containers for direct consumption of the drink fluids may offer a limited storage capacity. Some drink containers thus feature multiple vessels, such as may include a primary vessel for storing a relatively large volume of drink liquid and a secondary vessel for receiving a relatively small volume of the drink liquid from the primary vessel and facilitating direct consumption of the drink liquid. In such examples, it may be desirable that each of the primary vessel and the secondary vessel are selectively closed by respective vessel closures.

SUMMARY

Multi-vessel drink containers are disclosed herein. In some examples, a multi-vessel drink container includes a primary vessel and a secondary vessel. The primary vessel has a primary vessel dispensing region with a primary vessel opening and having a primary vessel internal volume configured to hold a volume of potable drink liquid. The secondary vessel has a secondary vessel dispensing region with a secondary vessel opening and having a secondary vessel internal volume configured to hold a volume of potable drink liquid. In some examples, a multi-vessel drink container further includes a primary closure and a secondary closure. The primary closure is configured to be selectively and operatively coupled to the primary vessel dispensing region to restrict the potable drink liquid from exiting the primary vessel internal volume. The secondary closure is configured to be selectively and operatively coupled to the secondary vessel dispensing region to restrict the potable drink liquid from exiting the secondary vessel internal volume. In some examples, the primary closure includes a primary closure base portion that defines a storage compartment and a compartment closure configured to be selectively and operatively coupled to the primary closure base portion to close the storage compartment. In some examples, the secondary vessel is configured to be selectively transitioned between a nested configuration, in which the secondary vessel is operatively coupled to the primary vessel such that at least a portion of the primary vessel extends within the secondary vessel internal volume, and a drink configuration, in which the secondary vessel is removed from the primary vessel. In some examples, the secondary closure is configured to be selectively transitioned between a stowed configuration, in which the secondary closure is received within the storage compartment and in which the compartment closure is operatively coupled to the closure base portion to close the storage compartment, and a use configuration, in which the secondary closure is operatively coupled to the secondary vessel dispensing region.

BRIEF DESCRIPTION OF THE DRAWINGS

FIG. 6 is an exploded side elevation view representing a primary vessel and a primary closure of the multi-vessel drink container of FIGS. 4-5 according to the present disclosure.

FIG. 7 is an exploded side elevation view representing the secondary vessel and the secondary closure of the multi-vessel drink container of FIGS. 4-6 according to the present disclosure.

DETAILED DESCRIPTION

FIGS. 1-8 provide examples of multi-vessel drink containers 100 and/or of components thereof, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numbers associated therewith may be utilized herein for consistency. Elements, components, and/or features that are discussed herein with reference to one or more of FIGS. 1-8 may be included in and/or utilized with the subject matter of any of FIGS. 1-8 without departing from the scope of the present disclosure.

In general, elements that are likely to be included in a given (i.e., a particular) embodiment are illustrated in solid lines, while elements that are optional to a given embodiment are illustrated in dash-dot lines. However, elements that are shown in solid lines are not essential to all embodiments, and an element shown in solid lines may be omitted from a given embodiment without departing from the scope of the present disclosure.

Figure 1:
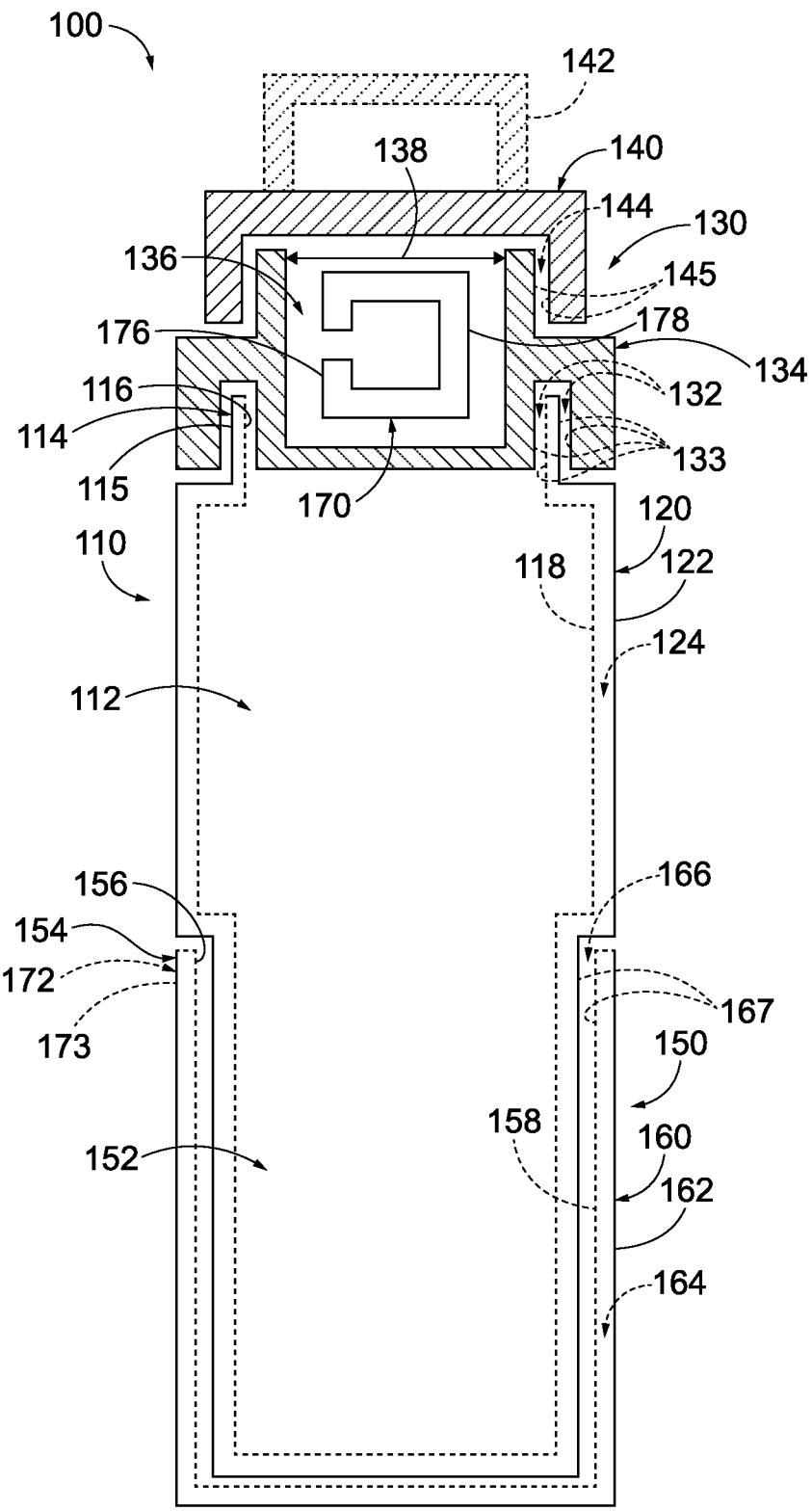
FIG. 1 is a schematic cross-sectional side elevation view representing examples of multi-vessel drink containers with a secondary vessel in a nested configuration and a secondary closure in a stowed configuration, according to the present disclosure.
Figures 2, 3:
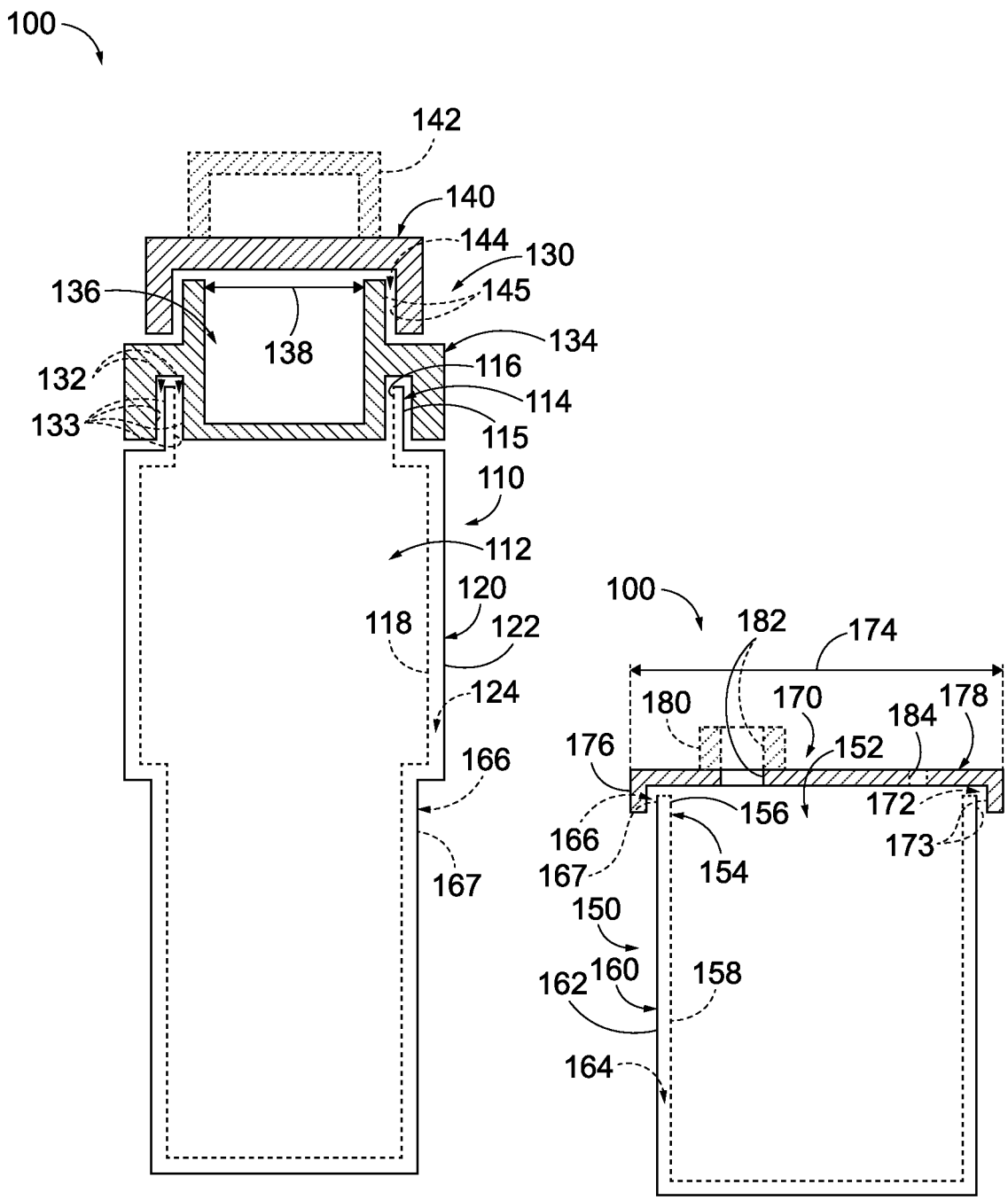
FIG. 2 is a schematic cross-sectional side elevation view representing examples of portions of multi-vessel drink containers according to the present disclosure.
FIG. 3 is a schematic cross-sectional side elevation view representing examples of portions of multi-vessel drink containers with a secondary vessel in a drink configuration and a secondary closure in a use configuration, according to the present disclosure.

FIG. 1 is a schematic cross-sectional side elevation view representing examples of a multi-vessel drink container 100, while FIGS. 2-3 are schematic cross-sectional side elevation views representing components of multi-vessel drink container 100 of FIG. 1 in distinct configurations from that of FIG. 1. As schematically illustrated in FIGS. 1-3, a multi-vessel drink container 100 includes a primary vessel 110 (schematically illustrated in FIGS. 1-2) and a secondary vessel 150 (schematically illustrated in FIGS. 1 and 3). Multi-vessel drink containers 100 according to the present disclosure may include at least two vessels, such as primary vessel 110 and secondary vessel 150. When multi-vessel drink container 100 includes only two vessels, it additionally or alternatively may be referred to as a dual-vessel drink container 100.

As schematically illustrated in FIGS. 1-2, primary vessel 110 includes a primary vessel internal volume 112 that is configured to hold a volume of potable drink liquid and which includes a primary vessel dispensing region 114 with a primary vessel opening 116 from which the potable drink liquid may be dispensed from the primary vessel. For example, primary vessel dispensing region 114 may define and/or at least substantially surround primary vessel opening 116. Similarly, and as schematically illustrated in FIGS. 1 and 3, secondary vessel 150 includes a secondary vessel internal volume 152 that is configured to hold a volume of potable drink liquid and which includes a secondary vessel dispensing region 154 with a secondary vessel opening 156 from which the potable drink liquid may be dispensed from the secondary vessel. For example, secondary vessel dispensing region 154 may define and/or at least substantially surround secondary vessel opening 156.

With continued reference to FIGS. 1-2, multi-vessel drink container 100 further includes a primary closure 130 configured to be selectively and operatively coupled to primary vessel dispensing region 114 to restrict the potable drink liquid from exiting primary vessel internal volume 112. When primary closure 130 is operatively coupled to primary vessel dispensing region 114, the primary closure may be described as covering, obstructing, and/or selectively preventing drink liquid from being dispensed from primary vessel 110 through primary vessel opening 116. When primary closure 130 is operatively coupled to primary vessel dispensing region 114, the primary closure may cover at least 70%, at least 80%, at least 90%, at least 95%, 100%, at most 100%, at most 95%, and/or at most 90% of primary vessel opening 116. Primary closure 130 additionally or alternatively may be referred to as a primary closure assembly 130, a primary lid 130, a primary lid assembly 130, a primary cap 130, and/or a primary cap assembly 130.

Similarly, and as additionally schematically illustrated in FIGS. 1 and 3, multi-vessel drink container 100 further includes a secondary closure 170 configured to be selectively and operatively coupled to secondary vessel dispensing region 154 to restrict the potable drink liquid from exiting secondary vessel internal volume 152. When secondary closure 170 is operatively coupled to secondary vessel dispensing region 154, the secondary closure may be described as covering, obstructing, and/or selectively preventing drink liquid from being dispensed from secondary vessel 150 through secondary vessel opening 156. When secondary closure 170 is operatively coupled to secondary vessel dispensing region 154, the secondary closure may cover at least 70%, at least 80%, at least 90%, at least 95%, 100%, at most 100%, at most 95%, and/or at most 90% of secondary vessel opening 156. Secondary closure 170 additionally or alternatively may be referred to as a secondary lid 170 and/or a secondary cap 170.

As used herein, the term "restrict," as used to describe a mechanism or action in opposition to a process or outcome, is intended to indicate that the mechanism or action operates to at least substantially, and optionally fully, diminish, block, and/or preclude the process or outcome from proceeding and/or being completed. As examples, the use of the term "restrict," such as in describing a closure as restricting a liquid from exiting an internal volume of a vessel, is intended to indicate that the closure selectively prevents, impedes, blocks, obstructs, and/or otherwise at least substantially limits a flow of the liquid from the vessel. As used herein, the term "prevent," as used to describe a mechanism or action in opposition to a process or outcome, is intended to indicate that the mechanism or action operates to fully block and/or preclude the process or outcome from proceeding and/or being completed during operative use of the structures and components according to the present disclosure. Stated differently, as used herein, the term "prevent" is not intended to indicate that the mechanism or action will fully block and/or preclude the process or outcome from proceeding and/or being completed in all possible situations or uses, but rather is intended to indicate that the process or outcome is prevented at least when the structures and components disclosed herein are utilized in a manner consistent with the present disclosure.

Multi-vessel drink container 100 generally is configured such that secondary vessel 150 may be selectively and operatively coupled to primary vessel 110. In this manner, and as described in more detail herein, multi-vessel drink container 100 is configured to be selectively transitioned between a configuration in which primary vessel 110 and secondary vessel 150 may be utilized independently and a configuration in which the components of multi-vessel drink container 100 are operatively coupled and/or joined such that the multi-vessel drink container may be transported as a single object. More specifically, secondary vessel 150 generally is configured to be selectively transitioned between a nested configuration (schematically illustrated in FIG. 1), in which the secondary vessel is operatively coupled to primary vessel 110, and a drink configuration (schematically illustrated in FIG. 3), in which the secondary vessel is removed from the primary vessel and is separably operable to receive and dispense drink liquid.

As schematically illustrated in FIG. 1, primary closure 130 generally is configured to selectively support and/or contain secondary closure 170 such that secondary closure 170 may be selectively and operatively stowed and carried in the primary closure. More specifically, and as schematically illustrated in FIGS. 1-2, primary closure 130 includes a primary closure base portion 134 and a compartment closure 140. The primary closure base portion defines a storage compartment 136, and the compartment closure 140 is configured to be selectively and operatively coupled to the primary closure base portion to close the storage compartment. In this manner, and as described herein, storage compartment 136 may be utilized to selectively contain and/or store secondary closure 170. As schematically illustrated in FIGS. 1-2, storage compartment 136 may be fluidly isolated from primary vessel internal volume 112 when primary closure 130 is operatively coupled to primary vessel 110. Accordingly, when secondary closure 170 and/or any other object is stored in storage compartment 136, the secondary closure and/or other object will not be contacted by the drink liquid in primary vessel internal volume 112.

As described in more detail herein, secondary closure 170 generally is configured to be selectively transitioned between a stowed configuration (schematically illustrated in FIG. 1), in which the secondary closure is received within storage compartment 136 and in which compartment closure 140 is operatively coupled to closure base portion 134 to close the storage compartment, and a use configuration (schematically illustrated in FIG. 3), in which the secondary closure is operatively coupled to secondary vessel dispensing region 154 to at least substantially close secondary vessel 150. In this manner, and as schematically illustrated in FIG. 3, secondary vessel 150 generally is in the drink configuration when secondary closure 170 is in the use configuration. Stated differently, secondary closure 170 generally may be in the use configuration only when secondary vessel 150 is in the drink configuration. Similarly, secondary closure 170 may be prevented from being transitioned to the use configuration while secondary vessel 150 is in the nested configuration due to primary vessel 110 extending through secondary vessel opening 156 when the secondary vessel is in the nested configuration.

For clarity, FIGS. 1-3 schematically illustrate some components of multi-vessel drink container 100 as being adjacent and spaced apart from one another. However, it is to be understood that any components that are schematically illustrated in FIGS. 1-3 as being adjacent and spaced apart from one another may be in contact with one another during operative use of multi-vessel drink container 100. As an example, while FIG. 1 schematically illustrates secondary vessel 150 as being spaced apart from primary vessel 110 when the secondary vessel is in the nested configuration, it is within the scope of the present disclosure that the secondary vessel directly contacts and/or engages the primary vessel when the secondary vessel is in the nested configuration. As another example, while each of FIGS. 1-3 schematically illustrate one or more closures (such as primary closure 130, secondary closure 170, and/or compartment closure 140) as being spaced apart from a respective vessel and/or component to which the closure is operatively coupled, each closure generally is in direct contact and/or engagement with the respective vessel and/or component when operatively coupled to the vessel and/or component.

Secondary closure 170 may have any appropriate form and/or structure for operatively engaging secondary vessel 150 when in the use configuration and for transitioning between the use configuration and the stowed configuration. For example, and as schematically illustrated in FIGS. 1 and 3, secondary closure 170 may include a secondary closure base portion 176 that is configured to operatively engage secondary vessel dispensing region 114 (as shown in FIG. 3) when the secondary closure is in the use configuration and a secondary closure cover portion 178 that is configured to at least substantially cover secondary vessel opening 156 (as shown in FIG. 3) when the secondary closure is in the use configuration.

In some examples, secondary closure 170 is configured to restrict, but not prevent, drink liquid from being dispensed from secondary vessel internal volume 152 when the secondary closure is in the use configuration. For example, secondary closure 170 may be configured to enable a user to drink and/or dispense the drink liquid from secondary vessel 150 when the secondary closure is in the use configuration. As a more specific example, and as schematically illustrated in FIG. 3, secondary closure 170 may include a secondary closure drink outlet 182 that is sized, positioned, and/or otherwise configured to enable a user to dispense the potable drink liquid from secondary vessel internal volume 152 when the secondary closure is in the use configuration. In such examples, secondary closure cover portion 178 may at least partially define secondary closure drink outlet 182. Additionally or alternatively, and as further schematically illustrated in FIG. 3, secondary closure 170 may include a secondary closure drink spout 180 that extends away from secondary closure base portion 176 and that includes and/or defines secondary closure drink outlet 182. In such examples, secondary closure cover portion 178 may at least partially define secondary closure drink spout 180. Additionally or alternatively, and as further schematically illustrated in FIG. 3, secondary closure cover portion 178 may define a secondary closure vent 184 that is configured to permit air to traverse secondary closure 170 into and out of secondary vessel internal volume 152 when the secondary closure is in the use configuration. In this manner, secondary closure vent 184 may enable the user to drink and/or dispense the drink liquid from secondary closure drink outlet 182 while secondary closure 170 is in the use configuration and without forming a partial vacuum in the portion of secondary vessel internal volume 152 that is unoccupied by the drink liquid.

In some examples, secondary closure 170 is configured to be selectively deformed to transition the secondary closure from the use configuration to the stowed configuration. For example, and as schematically illustrated in FIGS. 1-3, secondary closure 170 may have a secondary closure diameter 174 (shown in FIG. 3), as measured along a direction across secondary vessel opening 156 when the secondary closure is in the use configuration, and storage compartment 136 may have a storage compartment diameter 138 (shown in FIGS. 1-2) that is smaller than the secondary closure diameter. In such examples, secondary closure 170 may not fit within storage compartment 136 when the secondary closure assumes a conformation corresponding to the use configuration, such that the secondary closure must be folded, bent, twisted, collapsed, and/or otherwise selectively deformed as the secondary closure transitions from the use configuration to the stowed configuration in order to fit within the storage compartment. Accordingly, FIG. 1 schematically illustrates secondary closure 170 as being deformed so as to fit within storage compartment 136. Secondary closure 170 may be formed of any appropriate material, such as may be configured to facilitate the selective (reversible and/or resilient) deformation thereof, examples of which include a deformable material, a resilient material, an elastomeric material, a plastic, a rubber, a synthetic material, and/or silicone.

Each of primary vessel 110 and secondary vessel 150 may have any appropriate size, capacity, material construction, etc. For example, one or both of primary vessel 110 and secondary vessel 150 may be at least partially formed of a metal, aluminum, stainless steel, plastic, polycarbonate, and/or glass. Examples of suitable sizes, or capacities, of one or both of primary vessel internal volume 112 and secondary vessel internal volume 152 include at least 4 fluid ounces (oz.), at least 8 oz., at least 12 oz., at least 16 oz., at least 20 oz., at least 24 oz., at least 28 oz., at least 32 oz., at most 36 oz., at most 30 oz., at most 26 oz., at most 22 oz., at most 18 oz., at most 14 oz., at most 10 oz., at most 6 oz., 4-11 oz., 6-15 oz., 10-19 oz., 12-25 oz., 12-36 oz., 15-30 oz., 25-36 oz., 30-45 oz., 35-50 oz., and/or 10-70 oz. (with these examples referring to liquid (fluid) ounces of drink liquid that may be received at one time into an empty vessel). It is within the scope of the present disclosure that liquid vessels having different sizes, including sizes that are smaller than, larger than, or within the illustrative sizes and/or ranges presented above, may be used without departing from the scope of the present disclosure. In some examples, and as schematically illustrated in FIG. 1, secondary vessel internal volume 152 has a smaller capacity than primary vessel internal volume 112. In such examples, primary vessel 110 may be utilized to transport a volume of potable drink liquid and to dispense the potable drink liquid into secondary vessel 150 for consumption by a user, such that the secondary vessel may be filled more than once from the primary vessel.

In some examples, one or both of primary vessel 110 and secondary vessel 150 is a double-walled vessel, such as may enhance a thermal insulating property of the vessel. For example, and as schematically illustrated in FIGS. 1-2, primary vessel 110 may include a primary vessel inner body 118 that defines primary vessel internal volume 112, a primary vessel outer body 120, and a primary vessel void region 124 that extends between the primary vessel inner body and the primary vessel outer body. In some examples, primary vessel void region 124 is at least substantially evacuated of air. In such examples, primary vessel 110 also may be referred to as a vacuum-insulated primary vessel 110. Similarly, and as schematically illustrated in FIGS. 1 and 3, secondary vessel 150 may include a secondary vessel inner body 158 that defines secondary vessel internal volume 152, a secondary vessel outer body 160, and a secondary vessel void region 164 that extends between the secondary vessel inner body and the secondary vessel outer body. In some examples, secondary vessel void region 164 is at least substantially evacuated of air. In such examples, secondary vessel 150 also may be referred to as a vacuum-insulated secondary vessel 150. In some embodiments, the primary vessel void region and/or the secondary vessel void region may contain an insulating material in the form of an insulating solid, liquid, gel, foam, and/or gas.

Primary vessel 110 and secondary vessel 150 may have any appropriate configuration and/or relative orientation when the secondary vessel is in the nested configuration. For example, and as schematically illustrated in FIG. 1, multi-vessel drink container 100 generally is configured such that at least a portion of primary vessel 110 extends within secondary vessel internal volume 152 when secondary vessel 150 is in the nested configuration. As a more specific example, and as schematically illustrated in FIG. 1, at least a portion of primary vessel 110 may extend through secondary vessel opening 156 when secondary vessel 150 is in the nested configuration.

In some examples, primary vessel 110 may be shaped and/or sized to facilitate receiving secondary vessel 150 when the secondary vessel is in the nested configuration. For example, and as schematically illustrated in FIG. 1, primary vessel 110 may have a primary vessel external surface 122 and secondary vessel 150 may have a secondary vessel external surface 162 such that at least a portion of the primary vessel external surface is aligned with at least a portion of the secondary vessel external surface when the secondary vessel is in the nested configuration. Stated differently, when the secondary vessel is in the nested configuration, the primary vessel external surface and the secondary vessel external surface may be at least substantially continuous and/or smoothly shaped with one another such that multi-vessel drink container 100 has an appearance of including only a single vessel. In such examples, primary vessel outer body 120 may at least partially define primary vessel external surface 122, and/or secondary vessel outer body 160 may at least partially define secondary vessel external surface 162. In some examples, and as schematically illustrated in FIG. 1, primary vessel 110 at least substantially fills secondary vessel internal volume 152 when secondary vessel 150 is in the nested configuration. Stated differently, when secondary vessel 150 is in the nested configuration, primary vessel 110 may extend within secondary vessel internal volume 152 such that a substantial entirety of the secondary vessel internal volume is occupied by the primary vessel. Additionally or alternatively, and as further schematically illustrated in FIG. 1, multi-vessel drink container 100 may be configured such that primary vessel external surface 122 extends at least substantially adjacent to an internal surface of secondary vessel 150 (such as secondary vessel inner body 158) when secondary vessel 150 is in the nested configuration. Stated differently, when secondary vessel 150 is in the nested configuration, primary vessel 110 and the secondary vessel may be positioned in a close-fit arrangement so as to minimize a void space between the primary vessel and the secondary vessel (e.g., a portion of secondary vessel internal volume 152 that is unoccupied by the primary vessel).

When secondary vessel 150 is in the nested configuration, the secondary vessel may be operatively coupled to and/or retained upon primary vessel 110 in any appropriate manner. For example, and as schematically illustrated in FIGS. 1-3, multi-vessel drink container 100 may include a secondary vessel retention mechanism 166 for selectively retaining secondary vessel 150 in the nested configuration. In such examples, secondary vessel retention mechanism 166 may restrict secondary vessel 150 from being removed from primary vessel 110 when the secondary vessel is in the nested configuration. Secondary vessel retention mechanism 166 may have any appropriate form and/or structure. For example, and as additionally schematically illustrated in FIGS. 1-3, secondary vessel retention mechanism 166 may include a secondary vessel retention structure 167, with one or both of primary vessel 110 and secondary vessel 150 including at least a portion and/or an instance of the secondary vessel retention structure. Secondary vessel retention mechanism 166 and/or secondary vessel retention structure 167 may be a component of and/or incorporated into any appropriate portions of primary vessel 110 and/or secondary vessel 150. For example, and as schematically illustrated in FIGS. 1-3, secondary vessel retention mechanism 166 and/or secondary vessel retention structure 167 may be a component of and/or incorporated into secondary vessel dispensing region 154 and/or a portion of the primary vessel that is proximate the secondary vessel dispensing region when the secondary vessel is in the nested configuration (as schematically illustrated in FIG. 1). However, this is not required of all examples of multi-vessel drink container 100, and it is additionally within the scope of the present disclosure that primary vessel 110 and/or secondary vessel 150 may include secondary vessel retention mechanism 166 and/or secondary vessel retention structure 167 in any appropriate regions, such as a region in which the primary vessel and the secondary vessel overlap when the secondary vessel is in the nested configuration.

Secondary vessel retention structure 167 may include and/or be any appropriate structure and/or mechanism, examples of which include a threaded coupling structure, a bayonet lock structure, a frictional coupling structure, a press-fit coupling structure, a gasket, a magnetic coupling structure, a permanent magnet, and/or a ferromagnetic material. For example, when secondary vessel retention structure 167 includes a threaded coupling structure, each of primary vessel 110 and secondary vessel 150 (and/or secondary vessel dispensing region 154 thereof) may include secondary vessel retention structure 167 in the form of a screw thread. As another example, when secondary vessel retention structure 167 includes a frictional coupling structure, one or both of primary vessel 110 and secondary vessel 150 (and/or secondary vessel dispensing region 154 thereof) may include secondary vessel retention structure 167 in the form of a surface, coating, gasket, or band that is textured, dimensioned, constructed, and/or otherwise configured for frictional engagement. As another example, when secondary vessel retention structure 167 includes a magnetic coupling structure, one of primary vessel 110 and secondary vessel 150 (and/or secondary vessel dispensing region 154 thereof) may include secondary vessel retention structure 167 in the form of a permanent magnet, and the other of primary vessel 110 and secondary vessel 150 (and/or secondary vessel dispensing region 154 thereof) may include secondary vessel retention structure 167 in the form of a permanent magnet and/or a ferromagnetic material.

Primary closure 130 is configured to be removably coupled to primary vessel 110, such as to primary vessel dispensing region 114 thereof, to permit selective and non-destructive removal and replacement (i.e., repeated uncoupling and recoupling) of the primary closure relative to the primary vessel. For example, primary closure 130 may be uncoupled from primary vessel 110 to permit the primary vessel to receive a volume of potable drink liquid, after which the primary closure may be recoupled to the primary vessel. Primary closure 130 may have any appropriate structure and may be configured to be selectively and operatively coupled to primary vessel 110 and/or to primary vessel dispensing region 114 in any appropriate manner. For example, and as schematically illustrated in FIGS. 1-2, primary vessel dispensing region 114 may include and/or define a neck 115 that has a reduced diameter relative to a portion of primary vessel 110 adjacent to the primary vessel dispensing region. In such examples, primary closure 130 may engage neck 115 when the primary closure is operatively coupled to primary vessel 110. As a more specific example, primary closure base portion 134 may engage primary vessel dispensing region 114 and/or neck 115 when primary closure 130 is operatively coupled to primary vessel 110.

Primary closure 130 and/or primary vessel 110 may include any appropriate structure and/or mechanism for selectively and operatively coupling the primary closure to the primary vessel. For example, and as schematically illustrated in FIGS. 1-2, multi-vessel drink container 100 may include a primary closure coupling mechanism 132 for selectively coupling primary closure 130 to primary vessel dispensing region 114. In such examples, primary closure coupling mechanism 132 may restrict primary closure 130 from being removed from primary vessel dispensing region 114 when the primary closure is operatively coupled to the primary vessel dispensing region. For example, and as additionally schematically illustrated in FIGS. 1-2, primary closure coupling mechanism 132 may include a primary closure coupling structure 133, with one or both of primary closure 130 and primary vessel dispensing region 114 including at least a portion and/or an instance of the primary closure coupling structure. Primary closure coupling mechanism 132 and/or primary closure coupling structure 133 generally are configured to provide a liquid-tight connection between primary closure 130 and primary vessel 110. In some examples, and as schematically illustrated in FIGS. 1-2, primary closure 130 may be configured such that at least a portion of primary closure base portion 134 and/or storage compartment 136 extends at least partially through primary vessel opening 116 when the primary closure is operatively coupled to primary vessel dispensing region 114. In such examples, and as additionally schematically illustrated in FIGS. 1-2, primary vessel dispensing region 114 and/or primary closure 130 may include primary closure coupling structure 133 on any appropriate portion thereof, such as an interiorly-facing surface (e.g., a surface facing toward a central region thereof, such as primary vessel inner body 118) and/or on an exteriorly-facing surface (e.g., a surface facing away from a central region thereof, such as primary vessel outer body 120).

Primary closure coupling structure 133 may include and/or be any appropriate structure and/or mechanism, examples of which include a threaded coupling structure, a bayonet lock structure, a frictional coupling structure, a press-fit coupling structure, a gasket, a magnetic coupling structure, a permanent magnet, and/or a ferromagnetic material. For example, when primary closure coupling structure 133 includes a threaded coupling structure, each of primary closure 130 (and/or primary closure base portion 134 thereof) and primary vessel dispensing region 114 may include primary closure coupling structure 133 in the form of a screw thread. As another example, when primary closure coupling structure 133 includes a frictional coupling structure, one or both of primary closure 130 (and/or primary closure base portion 134 thereof) and primary vessel dispensing region 114 may include primary closure coupling structure 133 in the form of a surface coating, gasket, or band that is textured, dimensioned, constructed, and/or otherwise configured for frictional engagement. As another example, when primary closure coupling structure 133 includes a magnetic coupling structure, one of primary closure 130 (and/or primary closure base portion 134 thereof) and primary vessel dispensing region 114 may include primary closure coupling structure 133 in the form of a permanent magnet, and the other of primary closure 130 (and/or primary closure base portion 134 thereof) and primary vessel dispensing region 114 may include primary closure coupling structure 133 in the form of a permanent magnet and/or a ferromagnetic material.

Similarly, primary closure base portion 134 and/or compartment closure 140 may include any appropriate structure and/or mechanism for selectively and operatively coupling the compartment closure to the primary closure base portion. For example, and as schematically illustrated in FIGS. 1-2, multi-vessel drink container 100 may include a compartment closure coupling mechanism 144 for selectively coupling compartment closure 140 to primary closure base portion 134. In such examples, compartment closure coupling mechanism 144 may restrict compartment closure 140 from being removed from primary closure base portion 134 when the compartment closure is operatively coupled to the primary closure base portion. For example, and as additionally schematically illustrated in FIGS. 1-2, compartment closure coupling mechanism 144 may include a compartment closure coupling structure 145, with one or both of primary closure base portion 134 and compartment closure 140 including at least a portion and/or an instance of the compartment closure coupling structure.

Compartment closure coupling structure 145 may include and/or be any appropriate structure and/or mechanism, examples of which include a threaded coupling structure, a bayonet lock structure, a frictional coupling structure, a press-fit coupling structure, a gasket, a magnetic coupling structure, a permanent magnet, and/or a ferromagnetic material. For example, when compartment closure coupling structure 145 includes a threaded coupling structure, each of primary closure base portion 134 and compartment closure 140 may include compartment closure coupling structure 145 in the form of a screw thread. As another example, when compartment closure coupling structure 145 includes a frictional coupling structure, one or both of primary closure base portion 134 and compartment closure 140 may include compartment closure coupling structure 145 in the form of a surface coating, gasket, or band that is textured, dimensioned, constructed, and/or otherwise configured for frictional engagement. As another example, when compartment closure coupling structure 145 includes a magnetic coupling structure, one of primary closure base portion 134 and compartment closure 140 may include compartment closure coupling structure 145 in the form of a permanent magnet, and the other of primary closure base portion 134 and compartment closure 140 may include compartment closure coupling structure 145 in the form of a permanent magnet and/or a ferromagnetic material.

In some examples, and as further schematically illustrated in FIGS. 1-2, primary closure 130 and/or compartment closure 140 may include a handle 142 that extends away from primary closure base portion 134 when the compartment closure is operatively coupled to the primary closure base portion. In such examples, handle 142 may have any appropriate structure and/or dimensions, such as to facilitate carrying primary closure 130, primary vessel 110, and/or multi-vessel drink container 100. For example, and as schematically illustrated in FIGS. 1-2, handle 142 may define a closed loop, such as may be sized to receive one or more of a user's fingers.

As schematically illustrated in FIG. 3, secondary closure 170 is configured to be removably coupled to secondary vessel 150, such as to secondary vessel dispensing region 154 thereof, to permit selective and non-destructive removal and replacement (i.e., repeated uncoupling and recoupling) of the secondary closure relative to the secondary vessel. For example, secondary closure 170 may be uncoupled from secondary vessel 150 to permit the secondary vessel to receive a volume of potable drink liquid (such as from primary vessel 110), after which the secondary closure may be recoupled to the secondary vessel.

Secondary closure 170 and/or secondary vessel 150 may include any appropriate structure and/or mechanism for selectively and operatively coupling the secondary closure to the secondary vessel. For example, and as schematically illustrated in FIGS. 1 and 3, multi-vessel drink container 100 may include a secondary closure coupling mechanism 172 for selectively and operatively coupling secondary closure 170 to secondary vessel dispensing region 154 when the secondary closure is in the use configuration. In such examples, secondary closure coupling mechanism 172 may restrict secondary closure 170 from being removed from secondary vessel dispensing region 154 when the secondary closure is in the use configuration. For example, and as schematically illustrated in FIGS. 1 and 3, secondary closure coupling mechanism 172 may include a secondary closure coupling structure 173, with one or both of secondary closure 170 and secondary vessel dispensing region 154 including at least a portion and/or an instance of the secondary closure coupling structure. Secondary closure coupling mechanism 172 and/or secondary closure coupling structure 173 generally are configured to provide a liquid-tight connection between secondary closure 170 and secondary vessel 150, e.g., such that liquid is restricted from exiting secondary vessel internal volume 152 other than via secondary closure drink outlet 182.

Secondary closure coupling structure 173 may include and/or be any appropriate structure and/or mechanism, examples of which include a threaded coupling structure, a bayonet lock structure, a frictional coupling structure, a press-fit coupling structure, a gasket, a magnetic coupling structure, a permanent magnet, and/or a ferromagnetic material. For example, when secondary closure coupling structure 173 includes a threaded coupling structure, each of secondary closure 170 (and/or secondary closure base portion 176 thereof) and secondary vessel dispensing region 154 may include secondary closure coupling structure 173 in the form of a screw thread. As another example, when secondary closure coupling structure 173 includes a frictional coupling structure, one or both of secondary closure 170 (and/or secondary closure base portion 176 thereof) and secondary vessel dispensing region 154 may include secondary closure coupling structure 173 in the form of a surface coating, gasket, or band that is textured, dimensioned, constructed, and/or otherwise configured for frictional engagement. As another example, when secondary closure coupling structure 173 includes a magnetic coupling structure, one of secondary closure 170 (and/or secondary closure base portion 176 thereof) and secondary vessel dispensing region 154 may include secondary closure coupling structure 173 in the form of a permanent magnet, and the other of secondary closure 170 (and/or secondary closure base portion 176 thereof) and secondary vessel dispensing region 154 may include secondary closure coupling structure 173 in the form of a permanent magnet and/or a ferromagnetic material.

Turning now to FIGS. 4-8, FIGS. 4-8 illustrate components and aspects of a multi-vessel drink container 1000, which is an example of multi-vessel drink container 100. That is, FIGS. 4-8 illustrate examples of multi-vessel drink containers 100, and/or of components thereof with specific structures, features, and/or options described above in the context of FIGS. 1-3. However, these examples are not limiting, and it is additionally within the scope of the present disclosure that the examples of FIGS. 4-8 additionally or alternatively may include any appropriate combination of components, features, properties, materials of construction, and/or options described herein, such as with respect to FIGS. 1-3.

Figure 4:
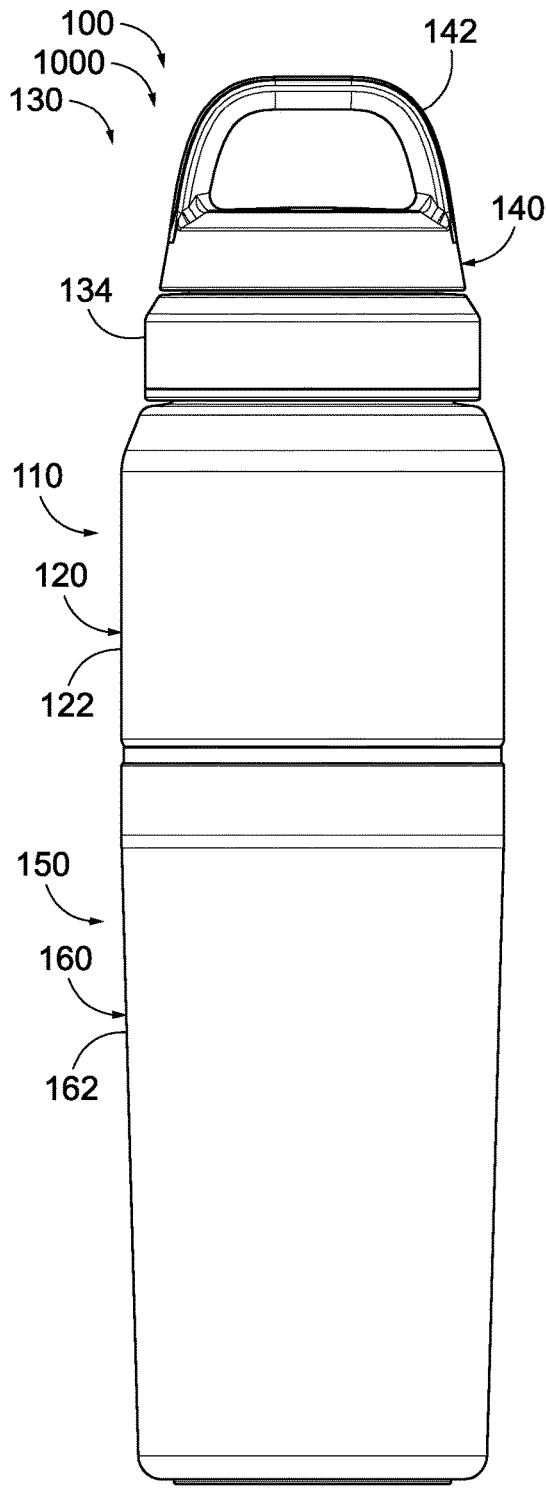
FIG. 4 is a side elevation view representing an example of a multi-vessel drink container with a secondary vessel in a nested configuration and a secondary closure in a stowed configuration, according to the present disclosure.
Figure 5:
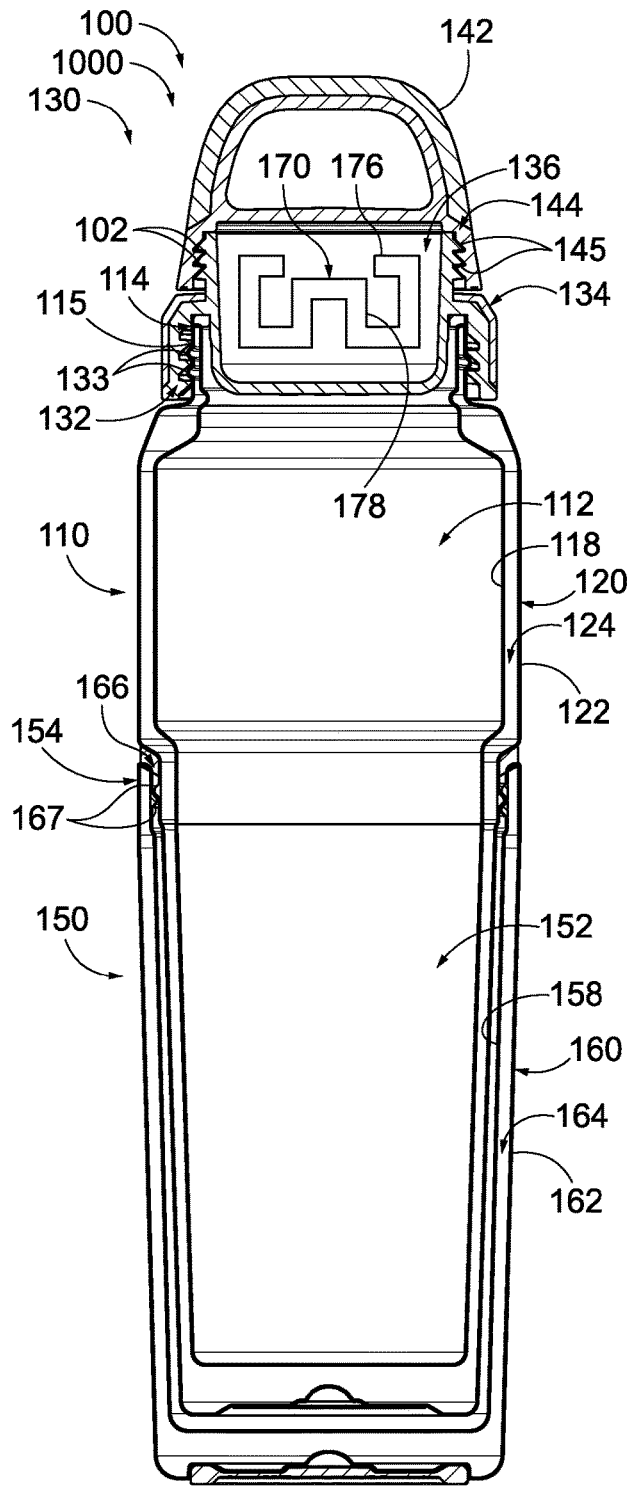
FIG. 5 is a cross-sectional side elevation view representing the multi-vessel drink container of FIG. 4 with the secondary vessel in the nested configuration and the secondary closure in the stowed configuration according to the present disclosure.

FIGS. 4-5 illustrate multi-vessel drink container 1000 with secondary vessel 150 in the nested configuration and with secondary closure 170 (shown in FIG. 5) in the stowed configuration. As shown in the cross-sectional view of FIG. 5, primary vessel 110 of multi-vessel drink container 1000 is a vacuum-insulated vessel that includes primary vessel inner body 118 and primary vessel outer body 120 separated by primary vessel void region 124 that is substantially evacuated of air. Similarly, and as further shown in FIG. 5, secondary vessel 150 of multi-vessel drink container 1000 is a vacuum-insulated vessel that includes secondary vessel inner body 158 and secondary vessel outer body 160 separated by secondary vessel void region 164 that is substantially evacuated of air. As additionally shown in FIG. 5, secondary vessel 150 is operatively coupled to primary vessel 110 to retain the secondary vessel in the nested configuration by secondary vessel retention mechanism 166 that includes secondary vessel retention structure 167 in the form of screw threads defined on each of primary vessel outer body 120 and secondary vessel dispensing region 154 of secondary vessel inner body 158. As further shown in FIG. 5, primary closure 130 is operatively coupled to primary vessel 110 by primary closure coupling mechanism 132 that includes primary vessel coupling structure 133 in the form of screw threads defined on each of primary vessel dispensing region 114 of primary vessel outer body 120 and primary closure base portion 134. As still further shown in FIG. 5, compartment closure 140 is operatively coupled to primary closure base portion 134 by compartment closure coupling mechanism 144 that includes compartment closure coupling structure 145 in the form of screw threads defined on each of primary closure base portion 134 and compartment closure 140.

Figure 8:
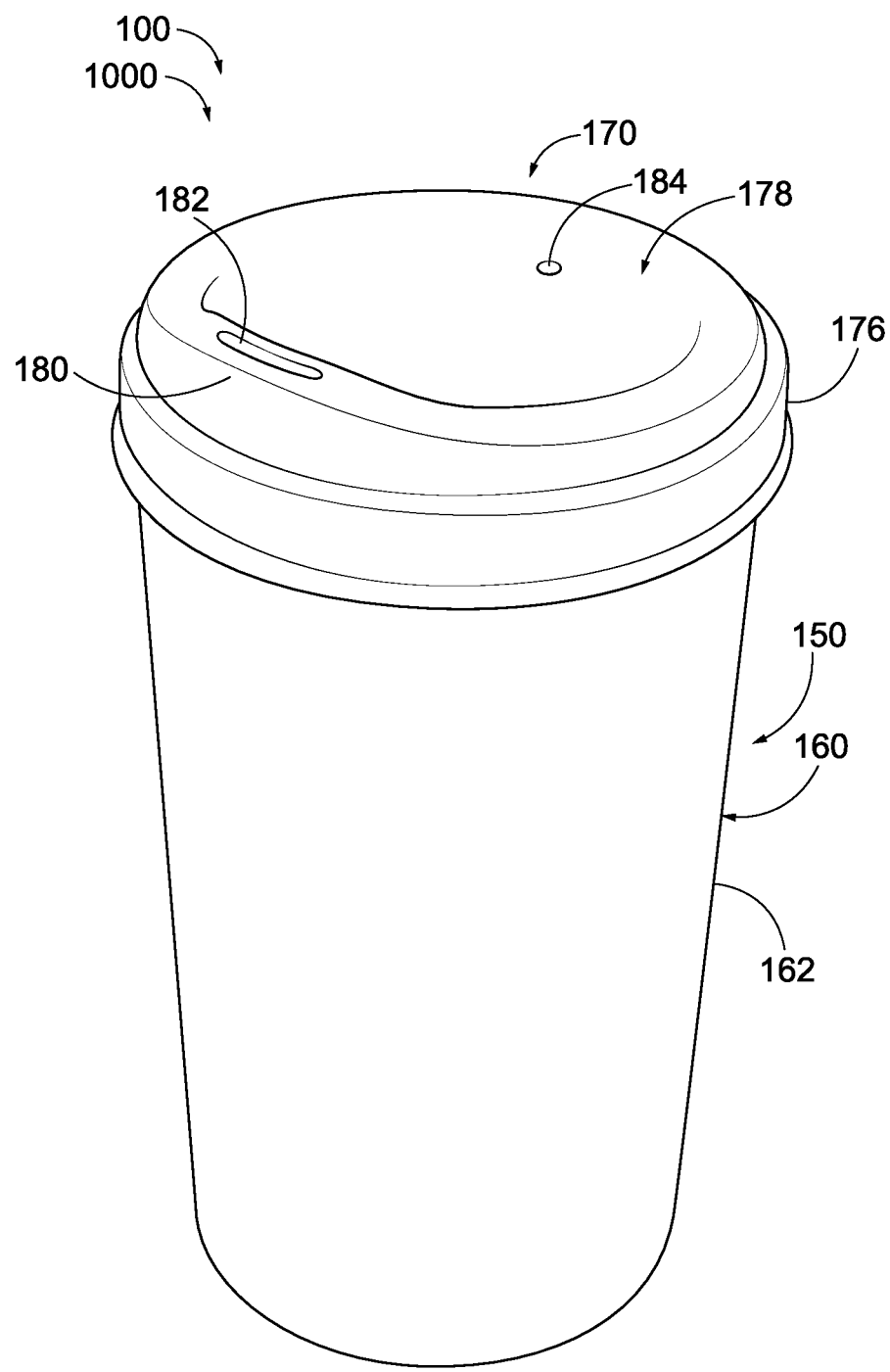
FIG. 8 is top side isometric view representing portions of the multi-vessel drink container of FIGS. 4-7 with the secondary vessel in the drink configuration and the secondary closure in the use configuration according to the present disclosure.

FIGS. 6-7 are exploded views of components of multi-vessel drink container 100. Specifically, FIG. 6 illustrates primary vessel 110 as well as primary closure base portion 134 and compartment closure 140 of primary closure 130, while FIG. 7 illustrates secondary vessel 150 in the drink configuration as well as secondary closure 170 removed from the secondary vessel. FIG. 8 illustrates secondary closure 170 operatively coupled to secondary vessel 150, i.e., such that the secondary vessel is in the drink configuration and such that the secondary closure is in the use configuration. As shown in FIGS. 7-8, secondary closure 170 of multi-vessel drink container 1000 includes secondary closure base portion 176 and secondary closure cover portion 178, with the secondary closure cover portion including secondary closure drink spout 180 that defines secondary closure drink outlet 182 and further including secondary closure vent 184.

Examples of multi-vessel drink containers according to the present disclosure are presented in the following enumerated paragraphs.

A1. A multi-vessel drink container, comprising:

a primary vessel having a primary vessel dispensing region with a primary vessel opening and having a primary vessel internal volume configured to hold a volume of potable drink liquid;

a secondary vessel having a secondary vessel dispensing region with a secondary vessel opening and having a secondary vessel internal volume configured to hold a volume of potable drink liquid;

a primary closure configured to be selectively and operatively coupled to the primary vessel dispensing region to restrict the potable drink liquid from exiting the primary vessel internal volume; and a secondary closure configured to be selectively and operatively coupled to the secondary vessel dispensing region to restrict the potable drink liquid from exiting the secondary vessel internal volume;

wherein the primary closure includes:

a primary closure base portion that defines a storage compartment; and a compartment closure configured to be selectively and operatively coupled to the primary closure base portion to close the storage compartment;

wherein the secondary vessel is configured to be selectively transitioned between a nested configuration, in which the secondary vessel is operatively coupled to the primary vessel such that at least a portion of the primary vessel extends within the secondary vessel internal volume, and a drink configuration, in which the secondary vessel is removed from the primary vessel; and wherein the secondary closure is configured to be selectively transitioned between a stowed configuration, in which the secondary closure is received within the storage compartment and in which the compartment closure is operatively coupled to the primary closure base portion to close the storage compartment, and a use configuration, in which the secondary closure is operatively coupled to the secondary vessel dispensing region.

A2. The multi-vessel drink container of paragraph A1, wherein the secondary vessel is in the drink configuration when the secondary closure is in the use configuration.

A3. The multi-vessel drink container of any of paragraphs A1-A2, wherein the secondary closure is prevented from being transitioned to the use configuration while the secondary vessel is in the nested configuration.

A4. The multi-vessel drink container of any of paragraphs A1-A3, wherein the primary vessel dispensing region includes a neck that has a reduced diameter relative to a portion of the primary vessel adjacent to the primary vessel dispensing region.

A5. The multi-vessel drink container of paragraph A4, wherein the primary closure engages the neck when the primary closure is operatively coupled to the primary vessel dispensing region.

A6. The multi-vessel drink container of any of paragraphs A1-A5, wherein the primary vessel dispensing region defines and at least substantially surrounds the primary vessel opening.

A7. The multi-vessel drink container of any of paragraphs A1-A6, wherein the secondary vessel dispensing region defines and at least substantially surrounds the secondary vessel opening.

A8. The multi-vessel drink container of any of paragraphs A1-A7, wherein the primary closure base portion engages the primary vessel dispensing region when the primary closure is operatively coupled to the primary vessel.

A9. The multi-vessel drink container of any of paragraphs A1-A8, wherein the storage compartment is fluidly isolated from the primary vessel internal volume when the primary closure is operatively coupled to the primary vessel.

A10. The multi-vessel drink container of any of paragraphs A1-A9, wherein the primary vessel at least substantially fills the secondary vessel internal volume when the secondary vessel is in the nested configuration.

A11. The multi-vessel drink container of any of paragraphs A1-A10, wherein the primary vessel has a primary vessel external surface, wherein the secondary vessel has a secondary vessel external surface, and wherein at least a portion of the primary vessel external surface is aligned with at least a portion of the secondary vessel external surface when the secondary vessel is in the nested configuration.

A12. The multi-vessel drink container of any of paragraphs A1-A11, further comprising a secondary vessel retention mechanism for selectively retaining the secondary vessel in the nested configuration, wherein the secondary vessel retention mechanism restricts the secondary vessel from being removed from the primary vessel when the secondary vessel is in the nested configuration.

A13. The multi-vessel drink container of paragraph A12, wherein the secondary vessel retention mechanism includes a secondary vessel retention structure, and wherein one or both of the primary vessel and the secondary vessel includes the secondary vessel retention structure.

A14. The multi-vessel drink container of paragraph A13, wherein one or both of:

(i) the primary vessel dispensing region includes the secondary vessel retention structure; and (ii) the secondary vessel dispensing region includes the secondary vessel retention structure.

A15. The multi-vessel drink container of any of paragraphs A13-A14, wherein the secondary vessel retention structure includes one or more of a threaded coupling structure, a bayonet lock structure, a frictional coupling structure, a press-fit coupling structure, a gasket, a magnetic coupling structure, a permanent magnet, and a ferromagnetic material.

A16. The multi-vessel drink container of any of paragraphs A13-A15, wherein the secondary vessel retention structure includes one or more of a surface, a coating, a gasket, and a band that is textured, dimensioned, constructed, and/or otherwise configured for frictional engagement.

A17. The multi-vessel drink container of any of paragraphs A1-A16, wherein the primary vessel includes a primary vessel inner body that defines the primary vessel internal volume, a primary vessel outer body, and a primary vessel void region that extends between the primary vessel inner body and the primary vessel outer body.

A18. The multi-vessel drink container of paragraph A17, wherein the primary vessel void region is at least substantially evacuated of air.

A19. The multi-vessel drink container of any of paragraphs A17-A18 wherein the primary vessel void region contains one or more of an insulating material, an insulating solid, an insulating liquid, an insulating gel, an insulating foam, and an insulating gas.

A20. The multi-vessel drink container of any of paragraphs A17-A19, wherein the primary vessel outer body at least partially defines a/the primary vessel external surface.

A21. The multi-vessel drink container of any of paragraphs A1-A20, wherein the secondary vessel includes a secondary vessel inner body that defines the secondary vessel internal volume, a secondary vessel outer body, and a secondary vessel void region that extends between the secondary vessel inner body and the secondary vessel outer body.

A22. The multi-vessel drink container of paragraph A21, wherein the secondary vessel void region is at least substantially evacuated of air.

A23. The multi-vessel drink container of any of paragraphs A21-A22, wherein the secondary vessel void region contains one or more of an insulating material, an insulating solid, an insulating liquid, an insulating gel, an insulating foam, and an insulating gas.

A24. The multi-vessel drink container of any of paragraphs A21-A23, wherein the secondary vessel outer body at least partially defines a/the secondary vessel external surface.

A25. The multi-vessel drink container of any of paragraphs A1-A24, wherein, when the primary closure is operatively coupled to the primary vessel dispensing region, the primary closure covers one or more of at least 70%, at least 80%, at least 90%, at least 95%, 100%, at most 100%, at most 95%, and at most 90% of the primary vessel opening.

A26. The multi-vessel drink container of any of paragraphs A1-A25, further comprising a primary closure coupling mechanism for selectively coupling the primary closure to the primary vessel dispensing region.

A27. The multi-vessel drink container of paragraph A26, wherein the primary closure coupling mechanism includes a primary closure coupling structure, and wherein one or both of the primary closure and the primary vessel dispensing region includes the primary closure coupling structure.

A28. The multi-vessel drink container of paragraph A27, wherein the primary closure coupling structure includes one or more of a threaded coupling structure, a bayonet lock structure, a frictional coupling structure, a press-fit coupling structure, a gasket, a magnetic coupling structure, a permanent magnet, and a ferromagnetic material.

A29. The multi-vessel drink container of any of paragraphs A27-A28, wherein the primary closure coupling structure includes one or more of a surface, a coating, a gasket, and a band that is textured, dimensioned, constructed, and/or otherwise configured for frictional engagement.

A30. The multi-vessel drink container of any of paragraphs A1-A29, further comprising a compartment closure coupling mechanism for selectively coupling the compartment closure to the primary closure base portion.

A31. The multi-vessel drink container of paragraph A30, wherein the compartment closure coupling mechanism includes a compartment closure coupling structure, and wherein one or both of the compartment closure and the primary closure base portion includes the compartment closure coupling structure.

A32. The multi-vessel drink container of paragraph A31, wherein the compartment closure coupling structure includes one or more of a threaded coupling structure, a bayonet lock structure, a frictional coupling structure, a press-fit coupling structure, a gasket, a magnetic coupling structure, a permanent magnet, and a ferromagnetic material.

A33. The multi-vessel drink container of any of paragraphs A31-A32, wherein the compartment closure coupling structure includes one or more of a surface, a coating, a gasket, and a band that is textured, dimensioned, constructed, and/or otherwise configured for frictional engagement.

A34. The multi-vessel drink container of any of paragraphs A1-A33, wherein the compartment closure includes a handle that extends away from the primary closure base portion when the compartment closure is operatively coupled to the primary closure base portion.

A35. The multi-vessel drink container of paragraph A34, wherein the handle defines a closed loop that is sized to receive one or more of a user's fingers.

A36. The multi-vessel drink container of any of paragraphs A1-A35, wherein at least a portion of the storage compartment extends at least partially through the primary vessel opening when the primary closure is operatively coupled to the primary vessel dispensing region.

A37. The multi-vessel drink container of any of paragraphs A1-A36, wherein the secondary closure is configured to be selectively deformed to transition the secondary closure from the use configuration to the stowed configuration.

A38. The multi-vessel drink container of paragraph A37, wherein the secondary closure is configured to be one or more of selectively folded, bent, twisted, and collapsed as the secondary closure transitions from the use configuration to the stowed configuration.

A39. The multi-vessel drink container of any of paragraphs A1-A38, wherein, when the secondary closure is operatively coupled to the secondary vessel dispensing region, the secondary closure covers one or more of at least 70%, at least 80%, at least 90%, at least 95%, 100%, at most 100%, at most 95%, and at most 90% of the secondary vessel opening.

A40. The multi-vessel drink container of any of paragraphs A1-A39, wherein the secondary closure includes a secondary closure base portion configured to operatively engage the secondary vessel dispensing region when the secondary closure is in the use configuration and a secondary closure cover portion configured to at least substantially cover the secondary vessel opening when the secondary closure is in the use configuration.

A41. The multi-vessel drink container of paragraph A40, wherein the secondary closure cover portion defines a secondary closure vent configured to permit air to traverse the secondary closure into and out of the secondary vessel internal volume when the secondary closure is in the use configuration.

A42. The multi-vessel drink container of any of paragraphs A1-A41, wherein the secondary closure includes a secondary closure drink outlet configured to enable a user to dispense the potable drink liquid from the secondary vessel internal volume when the secondary closure is in the use configuration.

A43. The multi-vessel drink container of paragraph A42, wherein a/the secondary closure cover portion at least partially defines the secondary closure drink outlet.

A44. The multi-vessel drink container of paragraph A43, wherein the secondary closure includes a secondary closure drink spout that extends away from a/the secondary closure base portion, and wherein the secondary closure drink spout includes the secondary closure drink outlet.

A45. The multi-vessel drink container of paragraph A44, wherein the secondary closure cover portion at least partially defines the secondary closure drink spout.

A46. The multi-vessel drink container of any of paragraphs A1-A45, further comprising a secondary closure coupling mechanism for selectively coupling the secondary closure to the secondary vessel dispensing region when the secondary closure is in the use configuration.

A47. The multi-vessel drink container of paragraph A46, when dependent from paragraph A40, wherein the secondary closure base portion includes at least a portion of a/the secondary closure coupling mechanism.

A48. The multi-vessel drink container of any of paragraphs A1-A47, wherein the secondary closure is formed of one or more of a deformable material, a resilient material, an elastomeric material, a plastic, a rubber, a synthetic material, and silicone.

A49. The multi-vessel drink container of any of paragraphs A1-A48, wherein the secondary closure has a secondary closure diameter, as measured along a direction across the secondary vessel opening when the secondary closure is in the use configuration, and wherein the storage compartment has a storage compartment diameter that is smaller than the secondary closure diameter.

A50. The multi-vessel drink container of any of paragraphs A1-A49, wherein the primary vessel is at least partially formed of one or more of a metal, aluminum, stainless steel, plastic, polycarbonate, and glass.

A51. The multi-vessel drink container of any of paragraphs A1-A50, wherein the primary vessel internal volume has a capacity that is one or more of at least 4 fluid ounces (oz.), at least 8 oz., at least 12 oz., at least 16 oz., at least 20 oz., at least 24 oz., at least 28 oz., at least 32 oz., at most 36 oz., at most 30 oz., at most 26 oz., at most 22 oz., at most 18 oz., at most 14 oz., at most 10 oz., at most 6 oz., 4-11 oz., 6-15 oz., 10-19 oz., 12-25 oz., 12-36 oz., 15-30 oz., 25-36 oz., 30-45 oz., 35-50 oz., and 10-70 oz.

A52. The multi-vessel drink container of any of paragraphs A1-A51, wherein the secondary vessel is at least partially formed of one or more of a metal, aluminum, stainless steel, plastic, polycarbonate, and glass.

A53. The multi-vessel drink container of any of paragraphs A1-A52, wherein the secondary vessel internal volume has a capacity that is one or more of at least 4 oz., at least 8 oz., at least 12 oz., at least 16 oz., at least 20 oz., at least 24 oz., at least 28 oz., at least 32 oz., at most 36 oz., at most 30 oz., at most 26 oz., at most 22 oz., at most 18 oz., at most 14 oz., at most 10 oz., at most 6 oz., 4-11 oz., 6-15 oz., 10-19 oz., 12-25 oz., 12-36 oz., 15-30 oz., 25-36 oz., 30-45 oz., 35-50 oz., and 10-70 oz.

A54. The multi-vessel drink container of any of paragraphs A1-A53, wherein the secondary vessel internal volume has a smaller capacity than the primary vessel internal volume.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, "selective" and "selectively," when modifying an action, movement, configuration, or other activity of one or more components or characteristics of a multi-vessel drink container according to the present disclosure, means that the specified action, movement, configuration, or other activity is a direct or indirect result of user manipulation of an aspect of, or one or more components of, the multi-vessel drink container.

As used herein, "operative" and "operatively," when modifying an action, movement, configuration, interconnection, coupling, or other relationship of one or more components of a multi-vessel drink container according to the present disclosure, means that the specified action, movement, configuration, interconnection, coupling or other relationship is performed and/or achieved as a result of standard (i.e., intended) operation and/or functional utilization of the one or more components of the multi-vessel drink container, such as in a manner described herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase "at least substantially," when used with reference to a property of one or more components, features, details, structures, embodiments, and/or methods according to the present disclosure, is intended to encompass components, features, details, structures, embodiments, and/or methods that predominantly and/or fully exhibit the property. Stated differently, as used herein, the phrase "at least substantially" is intended to be equivalent to the phrase "at least substantially, and optionally fully." Stated another way, as used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first component that at least substantially covers a second component includes a first component that covers at least 75% of the second component and also includes a first component that completely covers the second component.

As used herein, the phrase "at least partially," when used with reference to a property of one or more components, features, details, structures, embodiments, and/or methods according to the present disclosure, is intended to encompass components, features, details, structures, embodiments, and/or methods that partially, substantially, and/or fully exhibit the property. Stated differently, as used herein, the phrase "at least partially" is intended to be equivalent to the phrase "at least partially, and optionally fully."

INDUSTRIAL APPLICABILITY

The multi-vessel drink containers disclosed herein are applicable to the beverage container industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, also are regarded as included within the subject matter of the inventions of the present disclosure.

The invention claimed is:

1. A multi-vessel drink container, comprising:
   a primary vessel having a primary vessel dispensing region with a primary vessel opening and having a primary vessel internal volume configured to hold a volume of potable drink liquid;
   a secondary vessel having a secondary vessel dispensing region with a secondary vessel opening and having a secondary vessel internal volume configured to hold a volume of potable drink liquid;
   a primary closure removably coupled to the primary vessel dispensing region to restrict the potable drink liquid from exiting the primary vessel internal volume; and
   a secondary closure configured to be selectively and operatively coupled to the secondary vessel dispensing region to restrict the potable drink liquid from exiting the secondary vessel internal volume;
   wherein the primary closure comprises:
      a primary closure base portion removably coupled to the primary vessel dispensing region and comprising a closure base floor that seals the primary vessel opening, wherein the primary closure base portion defines a storage compartment above the closure base floor, the storage compartment being configured to store the secondary closure; and
      a compartment closure removably coupled to the primary closure base portion and comprising a handle extending from one edge of the compartment closure to an opposite edge of the compartment closure, wherein the compartment closure forms a ceiling of the storage compartment; and wherein the secondary vessel is configured to be selectively transitioned between a nested configuration, in which the secondary vessel is operatively coupled to the primary vessel such that at least a portion of the primary vessel extends within the secondary vessel internal volume, and a drink configuration, in which the secondary vessel is removed from the primary vessel.

2. The multi-vessel drink container of claim 1, wherein the secondary closure is configured to be selectively transitioned between a stowed configuration, in which the secondary closure is received within the storage compartment and in which the compartment closure is operatively coupled to the closure base portion to close the storage compartment, and a use configuration, in which the secondary closure is operatively coupled to the secondary vessel dispensing region.

3. The multi-vessel drink container of claim 2, wherein the secondary closure has a secondary closure diameter, as measured along a direction across the secondary vessel opening when the secondary closure is in the use configuration, and wherein the storage compartment has a storage compartment diameter that is smaller than the secondary closure diameter and wherein the secondary closure is configured to be selectively deformed to transition the secondary closure from the use configuration to the stowed configuration.

4. The multi-vessel drink container of claim 1, wherein the primary vessel at least substantially fills the secondary vessel internal volume when the secondary vessel is in the nested configuration.

5. The multi-vessel drink container of claim 1, further comprising a secondary vessel retention mechanism for selectively retaining the secondary vessel in the nested configuration, wherein the secondary vessel retention mechanism restricts the secondary vessel from being removed from the primary vessel when the secondary vessel is in the nested configuration, wherein the secondary vessel retention mechanism includes a secondary vessel retention structure, and wherein one or both of the primary vessel and the secondary vessel includes the secondary vessel retention structure.

6. The multi-vessel drink container of claim 5, wherein the secondary vessel retention structure includes one or more of a threaded coupling structure, a bayonet lock structure, a frictional coupling structure, a press-fit coupling structure, a gasket, a magnetic coupling structure, a permanent magnet, and a ferromagnetic material.

7. The multi-vessel drink container of claim 2, wherein the secondary closure includes a secondary closure drink outlet configured to enable a user to dispense the potable drink liquid from the secondary vessel internal volume when the secondary closure is in the use configuration.

8. The multi-vessel drink container of claim 7, wherein the secondary closure includes a secondary closure base portion configured to operatively engage the secondary vessel dispensing region when the secondary closure is in the use configuration and a secondary closure cover portion configured to at least substantially cover the secondary vessel opening when the secondary closure is in the use configuration, and wherein the secondary closure cover portion at least partially defines the secondary closure drink outlet.

9. The multi-vessel drink container of claim 8, wherein the secondary closure includes a secondary closure drink spout that extends away from the secondary closure base portion, and wherein the secondary closure drink spout includes the secondary closure drink outlet.

10. The multi-vessel drink container of claim 1, wherein at least a portion of the storage compartment extends at least partially through the primary vessel opening when the primary closure is operatively coupled to the primary vessel dispensing region.

11. The multi-vessel drink container of claim 1, wherein the handle extends away from the primary closure base portion when the compartment closure is operatively coupled to the primary closure base portion.

12. The multi-vessel drink container of claim 1, wherein the primary vessel dispensing region includes a neck that has a reduced diameter relative to a portion of the primary vessel adjacent to the primary vessel dispensing region.

13. The multi-vessel drink container of claim 1, wherein the storage compartment is fluidly isolated from the primary vessel internal volume when the primary closure is operatively coupled to the primary vessel.

14. The multi-vessel drink container of claim 1, wherein the primary vessel has a primary vessel external surface, wherein the secondary vessel has a secondary vessel external surface, and wherein at least a portion of the primary vessel external surface is aligned with at least a portion of the secondary vessel external surface when the secondary vessel is in the nested configuration.

15. The multi-vessel drink container of claim 1, wherein the primary vessel includes a primary vessel inner body that defines the primary vessel internal volume, a primary vessel outer body, and a primary vessel void region that extends between the primary vessel inner body and the primary vessel outer body; and wherein the primary vessel void region is at least substantially evacuated of air.

16. The multi-vessel drink container of claim 1, wherein the secondary vessel includes a secondary vessel inner body that defines the secondary vessel internal volume, a secondary vessel outer body, and a secondary vessel void region that extends between the secondary vessel inner body and the secondary vessel outer body; and wherein the secondary vessel void region is at least substantially evacuated of air.

17. The multi-vessel drink container of claim 1, wherein the primary vessel internal volume has a capacity that is 12-36 fluid ounces (oz.), and wherein the secondary vessel internal volume has a capacity that is 10-19 oz.

18. The multi-vessel drink container of claim 1, wherein the secondary vessel internal volume has a smaller capacity than the primary vessel internal volume.

19. The multi-vessel drink container of claim 1, further comprising a primary closure coupling mechanism for selectively coupling the primary closure to the primary vessel dispensing region; wherein the primary closure coupling mechanism includes a primary closure coupling structure; wherein one or both of the primary closure and the primary vessel dispensing region includes the primary closure coupling structure; and wherein the primary closure coupling structure includes one or more of a threaded coupling structure, a bayonet lock structure, a frictional coupling structure, a press-fit coupling structure, a gasket, a magnetic coupling structure, a permanent magnet, and a ferromagnetic material.

20. The multi-vessel drink container of claim 1, further comprising a compartment closure coupling mechanism for selectively coupling the compartment closure to the primary closure base portion; wherein the compartment closure coupling mechanism includes a compartment closure coupling structure; wherein one or both of the compartment closure and the primary closure base portion includes the compartment closure coupling structure; and wherein the compartment closure coupling structure includes one or more of a threaded coupling structure, a bayonet lock structure, a frictional coupling structure, a press-fit coupling structure, a gasket, a magnetic coupling structure, a permanent magnet, and a ferromagnetic material.

* * * * *